(12) United States Patent
Horiuchi et al.

(10) Patent No.: US 9,522,490 B2
(45) Date of Patent: *Dec. 20, 2016

(54) METHOD AND APPARATUS FOR FORMING THREE-DIMENSIONAL IMAGE

(71) Applicant: CASIO COMPUTER CO., LTD., Tokyo (JP)

(72) Inventors: Yuji Horiuchi, Tokyo (JP); Satoshi Kimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 681 days.

This patent is subject to a terminal disclaimer.

(21) Appl. No.: 13/716,580

(22) Filed: Dec. 17, 2012

(65) Prior Publication Data

US 2013/0168903 A1  Jul. 4, 2013

(30) Foreign Application Priority Data

Dec. 28, 2011  (JP) .................................. 2011-287276

(51) Int. Cl.
*B29C 44/02* (2006.01)
*B29C 44/04* (2006.01)

(52) U.S. Cl.
CPC ......... *B29C 44/022* (2013.01); *B29C 44/0461* (2013.01)

(58) Field of Classification Search
CPC . B29C 44/3415; B29C 44/0461; B29C 44/022

(Continued)

(56) References Cited

U.S. PATENT DOCUMENTS 4,871,408 A * 10/1989 Honma et al. ................... 156/83
4,874,407 A * 10/1989 Lefkowitz ....................... 96/400

(Continued)

FOREIGN PATENT DOCUMENTS

JP    64-28660 A    1/1989
JP    09193368 A    7/1997

(Continued)

OTHER PUBLICATIONS

Japanese Office Action dated Apr. 23, 2014, 2014 in counterpart Japanese Application No. 2011-287276.

(Continued)

*Primary Examiner* — Nahida Sultana
(74) *Attorney, Agent, or Firm* — Holtz, Holtz & Volek PC

(57) ABSTRACT

There are provided a method and apparatus for forming a three-dimensional image. The method and apparatus adjust the density in consideration of the influence of the expansion of a thermally expandable layer on the density of a display color or a color development state so that the originally planned density of the display color can be achieved, on the surface of a thermally expandable sheet. The method and apparatus form a mirror image of a colored image, of which the density of a black component is adjusted so as to correspond to the bulge height of the thermally expandable layer, on the back of the thermally expandable sheet. The method and apparatus expand the thermally expandable layer when irradiating the thermally expandable layer with light, which includes infrared wavelengths, from the back of the thermally expandable sheet.

6 Claims, 12 Drawing Sheets

(58) Field of Classification Search
USPC ..... 264/494, 482, 493, 40.6, 413; 425/174.4
See application file for complete search history.

(56) References Cited

U.S. PATENT DOCUMENTS

| | | | |
|---|---|---|---|
| 5,122,430 A * | 6/1992 | Nishitsuji et al. | 430/108.6 |
| 2006/0249884 A1 | 11/2006 | Partanen et al. | |
| 2007/0158877 A1 | 7/2007 | Rajner et al. | |
| 2010/0231443 A1 | 9/2010 | Whitehead | |
| 2012/0218338 A1 | 8/2012 | Kanamura et al. | |
| 2013/0161874 A1* | 6/2013 | Horiuchi | 264/415 |
| 2014/0110887 A1* | 4/2014 | Horiuchi | 264/413 |
| 2015/0070452 A1* | 3/2015 | Motoyanagi | 347/102 |
| 2015/0097308 A1 | 4/2015 | Batchelder et al. | |

FOREIGN PATENT DOCUMENTS

| | | | |
|---|---|---|---|
| JP | 2001-150812 A | 6/2001 |
| JP | 2002513697 A | 5/2002 |
| JP | 2007331257 A | 12/2007 |

OTHER PUBLICATIONS

Related U.S. Appl. No. 13/711,112; First Named Inventor: Yuji Horiuchi; Title: "Method and Apparatus for Forming Three-Dimensional Image"; filed Dec. 11, 2012.

* cited by examiner

FIG. 4A
FIG. 4B
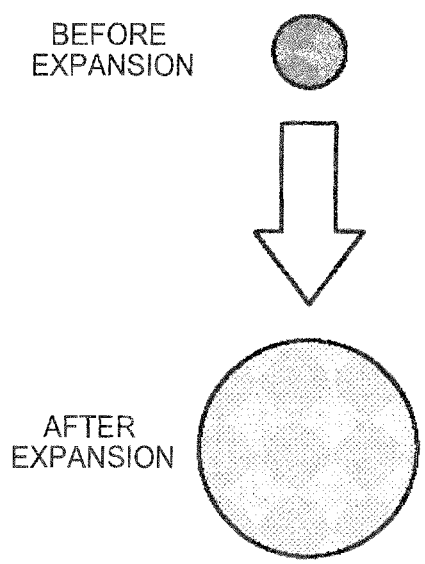
BEFORE EXPANSION
AFTER EXPANSION
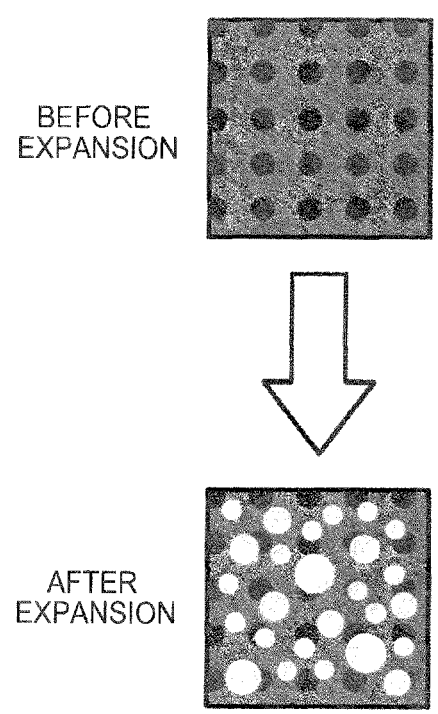
BEFORE EXPANSION
AFTER EXPANSION

DETAILS OF PORTION IX

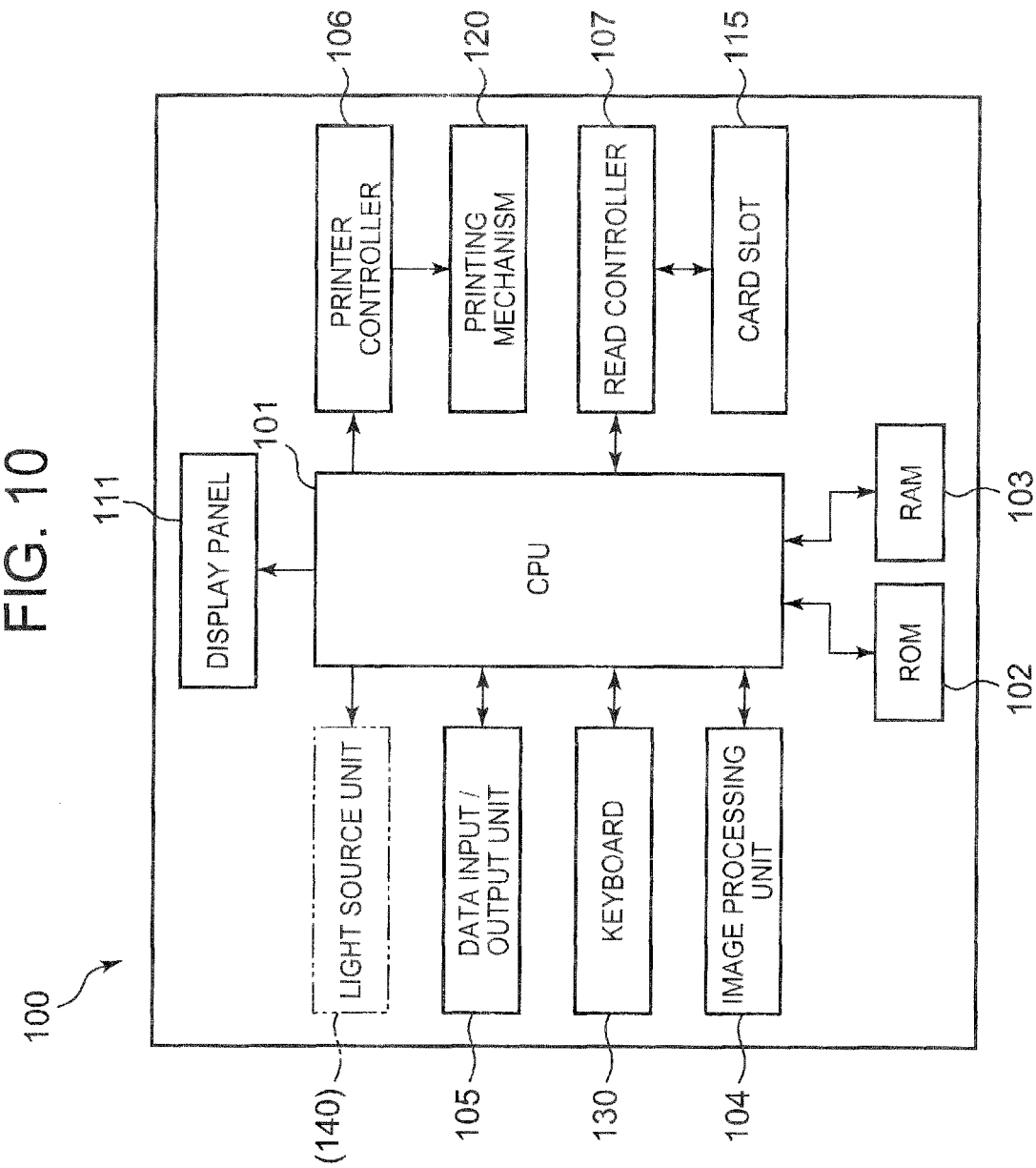

METHOD AND APPARATUS FOR FORMING THREE-DIMENSIONAL IMAGE

CROSS-REFERENCE TO RELATED APPLICATION

This application claims priority based on Japanese Patent Application No. 2011-287276, filed on Dec. 28, 2011, the entire contents of which are incorporated by reference herein.

BACKGROUND OF THE INVENTION

Field

The present invention relates to a method and apparatus for forming a three-dimensional image, and more particularly, to a method and apparatus for forming a three-dimensional image by selectively expanding a thermally expandable sheet.

Background

A thermally expandable sheet (or a thermally foamable sheet) where a thermally expandable layer (or a foamable layer) containing foamable microcapsules expanding due to heating is formed on one surface of a base sheet has been known in the past. When the thermally expandable sheet is irradiated with light including infrared light after an image pattern having a high light absorption property is printed on this thermally expandable sheet, the region of the thermally expandable layer corresponding to the image pattern is selectively heated and expanded. Accordingly, it is possible to form a three-dimensional image, which corresponds to the image pattern, on one surface of the base sheet.

As the technique for forming a three-dimensional image, for example, JP-A-64-28660 discloses a method including forming a print image using black toner or ink having a high light absorption property on the surface of a thermally expandable sheet that corresponds to a thermally expandable layer, or on the back of the thermally expandable sheet that corresponds to a base sheet; and forming a three-dimensional image by heating and expanding (foaming) the microcapsules of the region of the thermally expandable layer corresponding to the print image by irradiating the thermally expandable sheet with light from a halogen lamp or the like so that light is absorbed in the print image and heat is generated.

Further, for example, JP-A-2001-150812 discloses a method including forming a color image or the like on the surface of the thermally expandable sheet that corresponds to a thermally expandable layer; forming a light absorption pattern, which is formed of a grayscale image so as to correspond to the pattern of the color image formed on the surface, on the back of the thermally expandable sheet that corresponds to a base sheet; generating heat corresponding to the grayscale of the light absorption pattern by irradiating the thermally expandable sheet with light from the back of the thermally expandable sheet; and controlling the degree of the expansion of the thermally expandable layer to adjust the bulge height of a three-dimensional image.

According to the method disclosed in JP-A-2001-150812, it is possible to form a three-dimensional image of which an arbitrary portion is controlled to have an arbitrary bulge height (foam height) according to the pattern of the color image or the like that is formed on the surface of the thermally expandable sheet corresponding to the thermally expandable layer.

However, according to the result of the inventor's verification of these methods of forming a three-dimensional image, when the thermally expandable sheet is irradiated with light to form a three-dimensional image, the thermally expandable layer is expanded and bulges, so that the surface of the thermally expandable sheet is stretched. For this reason, it has been found that the display color of the color image or the like formed on the surface of the thermally expandable sheet becomes pale as compared to the initial state or color development becomes non-uniform, so that non-uniformity occurs. The reason for this is as follows: the surface of a bulging portion of the surface of the thermally expandable sheet is also stretched with the expansion of the thermally expandable layer and the area thereof is increased, so that the colored portion of the color image or the like is also stretched. Accordingly, the colored portion becomes pale, the density of the colored portion is reduced, or cracks are formed. As a result, the background color of the thermally expandable sheet, which is a foundation of the color image or the like, is seen or exposed to the outside so as to be visually recognized. For this reason, there is a problem in that it is not possible to form a good three-dimensional image due to the deterioration of the quality of the color image or the like. Meanwhile, the problem in the related art will also be described in detail in the detailed description to be described below.

SUMMARY

The invention has been made in consideration of the above-mentioned circumstances, and an object of the invention is to provide a method and apparatus for forming a three-dimensional image that can achieve a three-dimensional image of which a display color of a color image or the like has an intended density or a good color development state in consideration of the influence of the stretching of the surface, that is, the increase in the area of a thermally expandable sheet caused by the expansion of a thermally expandable layer when the thermally expandable sheet is irradiated with light to form a three-dimensional image.

In order to achieve the above-mentioned object of the invention, according to an aspect of the invention, there is provided a method of forming a three-dimensional image. The method including: forming a first print image on one surface of a thermally expandable sheet where a thermally expandable layer is formed on the one surface of a base sheet; forming a second print image on a region of the other surface of the thermally expandable sheet with a photothermal conversion material, the second print image being to be a mirror image of the first print image, the region of the other surface corresponding to the first print image of the one surface; forming a three-dimensional image of the first print image by selectively expanding the thermally expandable layer with thermal energy that is generated in the second print image when irradiating the thermally expandable sheet with light from the other surface of the thermally expandable sheet; and setting a density of a display color of the first print image so that an original density of the display color set in the first print image is achieved even after the expansion of the thermally expandable layer when the first print image is formed.

Further, in order to achieve the above-mentioned object of the invention, according to another aspect of the invention, there is provided an apparatus for forming a three-dimensional image. The apparatus includes a print function unit, a light source unit and an image processing unit. The print function unit forms a first print image on one surface of a thermally expandable sheet where a thermally expandable layer is formed on the one surface of a base sheet and forms a second print image on a region of the other surface of the thermally expandable sheet with a photothermal conversion material. The second print image is to be a mirror image of the first print image. The region of the other surface corresponds to the first print image of the one surface. The light source unit forms a three-dimensional image of the first print image by selectively expanding the thermally expandable layer with thermal energy that is generated in the second print image when irradiating the thermally expandable sheet with light from the other surface of the thermally expandable sheet where the first print image is formed on the one surface and the second print image is formed on the other surface. The image processing unit sets a density of a display color of the first print image in consideration of a change of the density of the display color of the first print image caused by the expansion of the thermally expandable layer so that an original density of the display color set in the first print image is achieved after the expansion of the thermally expandable layer.

According to the method and apparatus for forming a three-dimensional image of the aspects of the invention, it is possible to achieve a three-dimensional image of which a display color of a color image or the like has an intended density or a good color development state in consideration of the influence of the stretching of the surface, that is, the increase in the area of a thermally expandable sheet caused by the expansion of a thermally expandable layer when the thermally expandable sheet is irradiated with light to form a three-dimensional image.

BRIEF DESCRIPTION OF THE DRAWINGS

A more complete understanding of this application can be obtained when the following detailed description is considered in conjunction with the following drawings, in which:

FIGS. 4A and 4B are schematic views illustrating an issue of the method of forming a three-dimensional image according to the comparative example;

FIG. 10 is a functional block diagram of an example of the printer applied to the embodiment of the invention.

DETAILED DESCRIPTION

A method and apparatus for forming a three-dimensional image according to the invention will be described in detail below with reference to embodiments.

<Method of Forming Three-Dimensional Image>

First, a method of forming a three-dimensional image according to the invention will be described.

Figure 1:
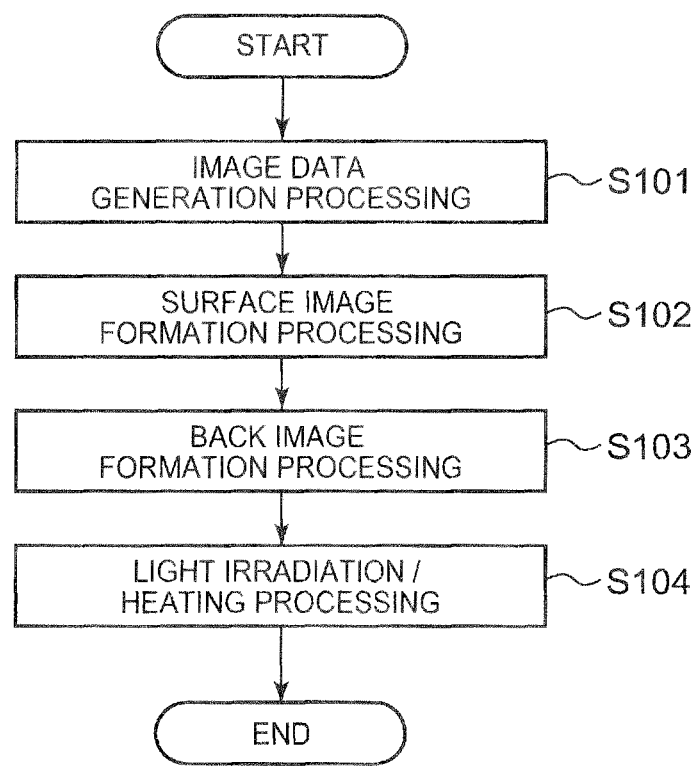
FIG. 1 is a flow chart illustrating an example of a method of forming a three-dimensional image according to the invention.

FIG. 1 is a flow chart illustrating an example of a method of forming a three-dimensional image according to the invention.

As shown in FIG. 1, the method of forming a three-dimensional image according to an embodiment substantially includes image data generation processing (S101), surface image formation processing (S102), back image formation processing (S103), and light irradiation/heating processing (S104).

In the image data generation processing (S101), the image data of an arbitrary colored image that is to be a target of a three-dimensional image (hereinafter, referred to as "surface image data") and a thermally expandable sheet on which a three-dimensional image of the colored image to be formed are prepared first. Here, the thermally expandable sheet is a sheet where a thermally expandable layer (foamable layer) containing foamable microcapsules is formed on one surface of a base sheet as described above. Further, the colored image may be a color image and may be a monochrome image or a monotone image.

After that, the density data of a black component, which is set in a specific region or pixels such as a pattern of the colored image, is extracted on the basis of the surface image data. Further, the bulge height (foam height) data of the thermally expandable layer, which are scheduled in the specific region or the like when the thermally expandable sheet is heated to form a three-dimensional image, are extracted. Furthermore, image data where the density of a black component of a specific portion, which corresponds to the specific region or the like, of a mirror image, which is an inverted image of the colored image, are set (hereinafter, referred to as "back image data") are generated on the basis of the density data and the bulge height data by a data processing method to be described below. Further, when a thermally expandable sheet is heated on the basis of the density data and the bulge height data by a data processing method to be described below to form a three-dimensional image, the density of a display color set in the specific region or the like on the surface image data is adjusted (is set to a high level) in anticipation of the change (reduction of the density or the change (deterioration) of the color development state of the display color set in the specific region or the like of the colored image. Meanwhile, in this specification, a black component contained in the mirror image is not limited to black as a color and means a photothermal conversion material that generates thermal energy by absorbing light including infrared wavelengths (which means far-infrared wavelengths in a broad sense). For example, carbon black is applied as such a photothermal conversion material.

In the image data generation processing (S101), a data processing method of adjusting the density of a display color of the colored image is conceptually performed as follows. That is, when light irradiation/heating processing to be described below is performed, the bulge height (or the amount of expansion) of the thermally expandable layer of the thermally expandable sheet depends on the density of a mirror image that is formed on the back of the base sheet of the thermally expandable sheet. At this time, since the thermally expandable layer is expanded while the surface of the thermally expandable sheet is stretched, that is, the area of the surface of the bulge is increased, the colored image formed on the surface (the surface corresponding to the thermally expandable layer) of the thermally expandable sheet is also stretched. For this reason, the density of the display color of the colored image, which is formed before the expansion of the thermally expandable layer, is reduced or non-uniformity occurs in color development. Accordingly, in this embodiment, the density of the display color of the colored image is adjusted to a high level in advance according to the amount of expansion or the expansion rate of the colored image, which is derived on the basis of the bulge height or the like of the thermally expandable layer, in anticipation of (in consideration of) the change of the density or the color development state of the display color of the colored image, which is formed on the surface of the thermally expandable sheet, when the light irradiation/heating processing is performed so that the originally planned display color can be achieved. Meanwhile, this data processing method will be described in detail in the verification of an effect to be described below.

Then, in the surface image formation processing (S102), a colored image, of which the density of the display color has been adjusted according to the amount of expansion or the expansion rate of the colored image by the data processing method, is formed (printed) on the surface of the thermally expandable sheet. In this case, the amount of expansion or the expansion rate means the area of the expanded colored image, which is caused by the bulge of the thermally expandable layer, relative to the area of the colored image that has not yet expanded. Here, various printers, such as an inkjet printer, a laser printer, and a thermal transfer printer, mentioned in an apparatus for forming a three-dimensional image to be described below can be applied to form the colored image on the surface of the thermally expandable sheet.

After that, in the back image formation processing (S103), a black mirror image, of which the density is set on the basis of the bulge height of the thermally expandable layer, is formed (printed) using the back image data on the back of the thermally expandable sheet so as to correspond to the position of the colored image formed on the surface of the thermally expandable sheet. Here, various printers, such as an inkjet printer, a laser printer, and a thermal transfer printer, mentioned in an apparatus for forming a three-dimensional image to be described below can also be applied to form the mirror image on the back of the thermally expandable sheet.

Then, in the light irradiation/heating processing (S104), the thermally expandable sheet, where the colored image is formed on the surface and the mirror image is formed on the back as described above, is uniformly irradiated with light, which includes infrared wavelengths, from the back of the thermally expandable sheet by a light source, such as a halogen lamp or an infrared lamp. Accordingly, the mirror image formed on the back of the thermally expandable sheet absorbs the light of the irradiation and generates thermal energy, so that the region of the thermally expandable layer corresponding to the mirror image is heated.

The microcapsules of the corresponding region of the thermally expandable layer expand (foam) due to the thermal energy that is generated in the mirror image formed on the back of the thermally expandable sheet as described above. Accordingly, the thermally expandable layer bulges to a planned (that is, a preset predetermined) height, so that an intended three-dimensional image is formed.

Next, the data processing method of the above-mentioned method of forming a three-dimensional image and the effect thereof will be specifically verified with reference to a comparative example. Here, a case where a three-dimensional image, where the densities of the respective colored portions of a colored image of the thermally expandable sheet, where the intended colored image is formed on the surface, are uniformly kept, and the respective colored portions expand to different arbitrary bulge heights, is formed will be described to make the gist of the invention concise.

After a method of forming a three-dimensional image according to a comparative example will be described first and the problems of the method according to the comparative example are verified, the characteristics and effects of the method of forming a three-dimensional image according to this embodiment will be described.

Figures 2A, 2B:
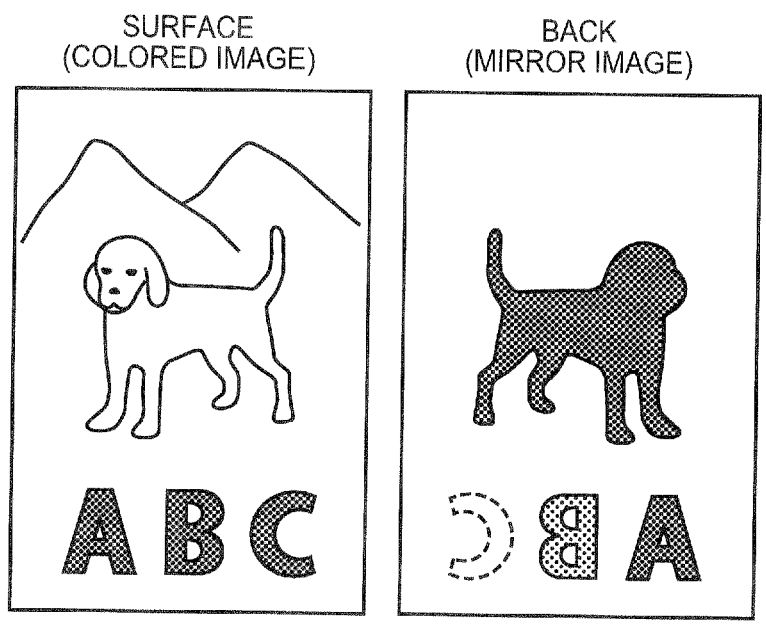
FIGS. 2A, 2B, and 2C are schematic plan views illustrating a method of forming a three-dimensional image according to a comparative example.
Figure 2C:
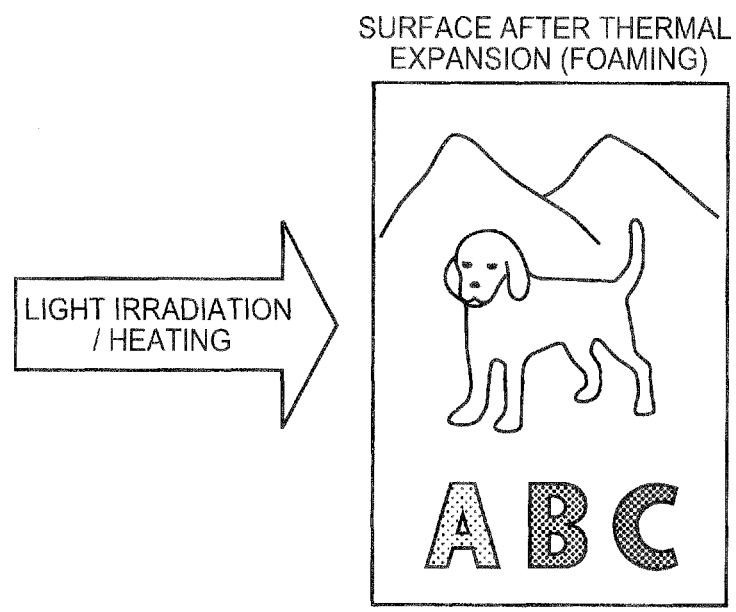

FIGS. 2A, 2B, and 2C are schematic plan views illustrating a method of forming a three-dimensional image according to a comparative example, and FIGS. 3A, 3B, 3C, and 3D are schematic cross-sectional views illustrating the method of forming a three-dimensional image according to the comparative example. Here, FIGS. 3A, 3B, 3C, and 3D are views schematically showing the cross-sections of letter portions of "A", "B", and "C" shown in FIGS. 2A, 2B, and 2C. FIGS. 4A and 4B are conceptual diagrams illustrating the issues of the method of forming a three-dimensional image according to the comparative example.

In the method of forming a three-dimensional image according to the comparative example of the invention, for example, a three-dimensional image where only the letter portions among the image of the dog and the images of the letters of "A", "B", and "C" printed on the surface of the thermally expandable sheet are formed with display colors having uniform density and bulge to different arbitrary heights as shown in FIGS. 2A, 2B, and 2C is formed. Meanwhile, a three-dimensional image where the image of the dog has a background color (for example, a substantially white color) of the thermally expandable sheet and bulges to an arbitrary height is formed.

Figure 3A:
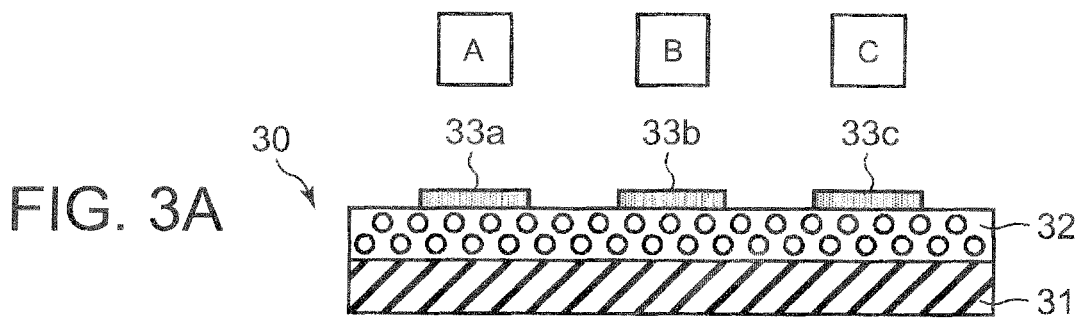
FIGS. 3A, 3B, 3C, and 3D are schematic cross-sectional views illustrating the method of forming a three-dimensional image according to the comparative example.

In this case, first, as shown in FIG. 3A, the image of the dog and the images of the letters are formed (printed) with an arbitrary display color on the surface, which corresponds to a thermally expandable layer, of a thermally expandable sheet 30 where the thermally expandable layer 32 is coated and formed on one surface of a base sheet 31 (the upper surface in FIG. 3A) as in the case shown in FIG. 2A. Here, the image of the dog is formed with the background color of the thermally expandable sheet, and the letter portions 33*a* to 33*c* of "A", "B", and "C" shown in FIG. 3A are formed with the same display color having the same density.

Figure 3B:
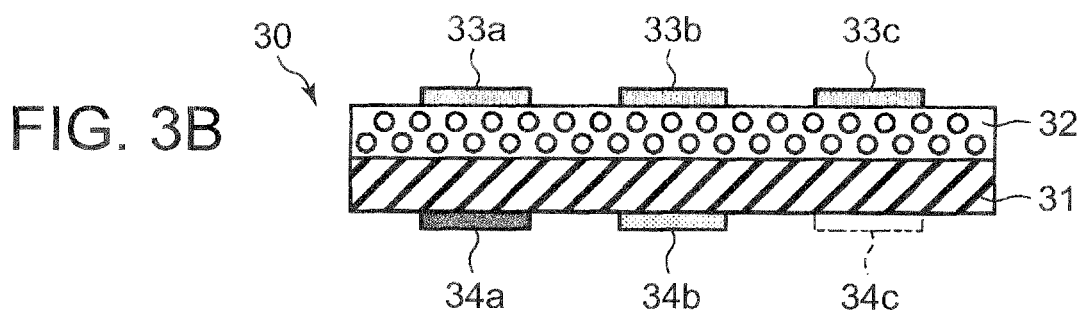

Then, mirror images, which are to be the inverted images of the image of the dog and the images of the letters formed on the surface (the surface corresponding to the thermally expandable layer) of the thermally expandable sheet 30, are generated, and are formed (printed) on the back (the surface corresponding to the of the base sheet) of the thermally expandable sheet 30 as shown in FIGS. 2B and 3B. Here, the mirror images of the image of the dog and the images of the letters are formed with inks or toners containing black components, which are set to a predetermined density, so that the bulge height (or the amount of expansion) of the thermally expandable layer 32 of the thermally expandable sheet 30 becomes a planned arbitrary height when light irradiation/heating processing to be described below is performed. That is, the density of the mirror image corresponding to the colored image, which is formed on the surface of the thermally expandable sheet 30, is set on the basis of only the bulge height that is planned in the colored image.

Specifically, in this comparative example, the density of the black component of the mirror image is set so that the image of the dog has an arbitrary bulge height as shown in FIG. 2B, the density of the black component of a mirror image 34a is set to a high level so that the letter portion 33a of "A" bulges to the highest level as shown in FIG. 3B, and the density of the black component of a mirror image 34b is set to a relatively high level (a density lower than the density of "A") so that the letter portion 33b of "B" bulges to a relatively high level (an arbitrary height lower than the height of "A"). Meanwhile, a mirror image 34c of the letter portion 33c is not formed so that the letter portion 33c of "C" does not bulge (the mirror image 34c is shown in FIGS. 2B and 3B by a two-dot chain line for convenience).

Figure 3C:
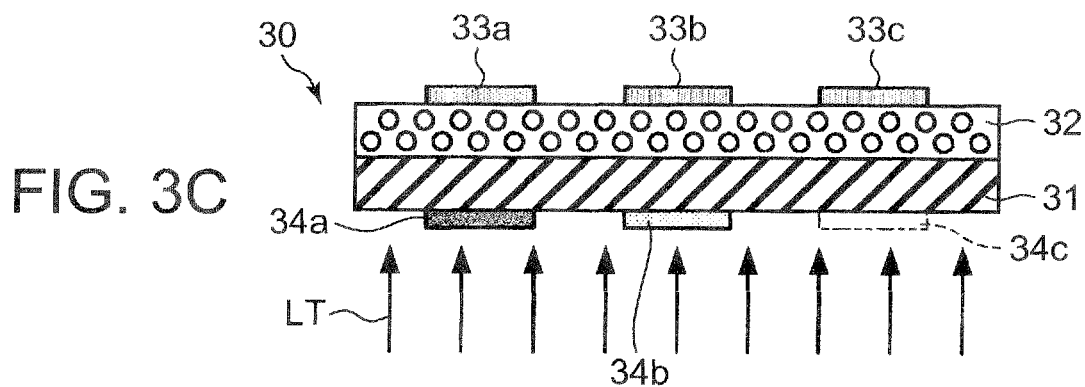

After that, the thermally expandable sheet is uniformly irradiated with light LT, which has a predetermined intensity, from the back of the thermally expandable sheet 30 as shown in FIG. 3C, so that thermal energy is generated according to the densities of the black components of the mirror images shown in FIG. 2B. As a result, the regions of the thermally expandable layer 32 corresponding to the mirror images are heated and expanded as shown in FIG. 3D.

Figure 3D:
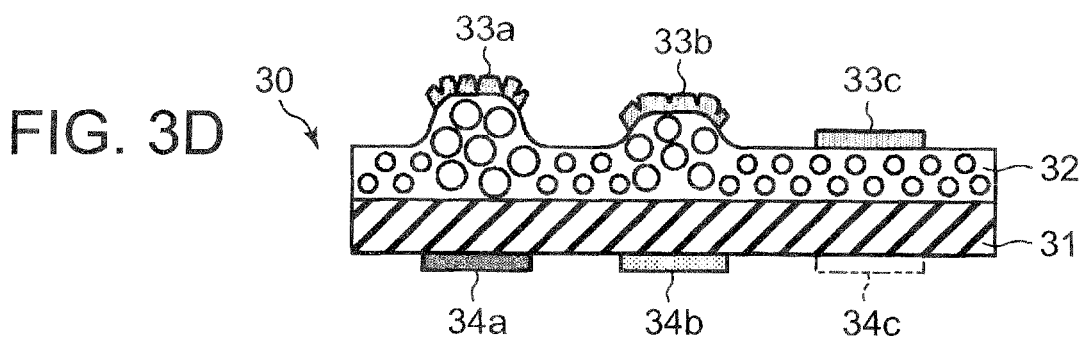

Here, the bulge heights of the thermally expandable layer 32 depend on the densities of the black components of the mirror images 34a and 34b as shown in FIG. 3D. However, at this time, the amounts of expansion or the expansion rates of the thermally expandable layer 32 are also increased as the bulge heights of the thermally expandable layer 32 are set to be higher. For this reason, the area of the surface of the thermally expandable sheet 30 is increased when the surface of the thermally expandable sheet 30 is stretched, and the areas of the colored portions are also increased when the colored portions (that is, the letter portions 33a and 33b) of the colored image formed on the surface of the thermally expandable sheet are also stretched. Accordingly, as shown in FIG. 3D, the thicknesses of the letter portions 33a and 33b are reduced, the densities of the letter portions 33a and 33b are reduced, or cracks are formed in the letter portions 33a and 33b and the background color of the thermally expandable sheet 30, which is a foundation of the letter portions 33a and 33b, (strictly speaking, the background color of the thermally expandable layer 32) is seen or exposed to the outside so as to be visually recognized. For this reason, the densities of the letter portions 33a and 33b of "A" and "B" formed on the surface of the thermally expandable sheet 30 become lower than the initial states (the states of FIGS. 2A and 3A) as shown in FIG. 2C, so that the display color becomes pale or non-uniformity occurs in the color development of the display color and the quality of the colored image deteriorates. As a result, there is an issue in that a good three-dimensional image cannot be formed. This state is conceptually shown in FIGS. 4A and 4B. FIG. 4A is a conceptual diagram showing that the densities of the colored portions (that is, the above-mentioned letter portions 33a and 33b) of the colored images are changed (reduced) due to the expansion of the thermally expandable layer 32 caused by the light irradiation/heating processing and the display color is changed (becomes pale), and FIG. 4B is a conceptual diagram showing that the color development states of the colored portions (that is, the letter portions 33a and 33b) of the colored images are changed (non-uniformity occurs in the color development) due to the expansion of the thermally expandable layer 32 caused by the light irradiation/heating processing. That is, the area of the surface of an expanded portion of the thermally expandable layer 32 is changed between before and after expansion, which shows that the color or state of the surface is changed.

Accordingly, in the method of forming a three-dimensional image according to the invention, the densities of the display colors are adjusted on the basis of the content of verification shown in FIGS. 2 to 4 in anticipation of (in consideration of) the influence of the expansion of the thermally expandable layer on the densities or the color development states of the display colors so that the display colors corresponding to the originally planned densities or color development states can be achieved even when the display colors of the colored images formed on the surface of the thermally expandable sheet are affected by the expansion of the thermally expandable layer in the light irradiation/heating processing.

Specifically, when the amount of expansion or the expansion rates, that is, the areas of the surfaces of specific regions of the colored images, which are expanded by the light irradiation/heating processing, become, for example, double that of those of the specific regions which have not yet expanded, in the thermally expandable sheet of which the bulge heights are defined on the basis of the densities set in the mirror images, which are to be inverted images of the colored images, the densities of the display colors set in the regions are set to double that of the initial densities set in the surface image data. That is, in this embodiment, the expansion rates (or the amounts of expansion) of the colored images (or the expandable layer) and the adjustment magnification (or setting magnification) of the densities of the display colors of the colored images are equal to each other or are set to be in a proportional relationship.

Figures 5A, 5B:
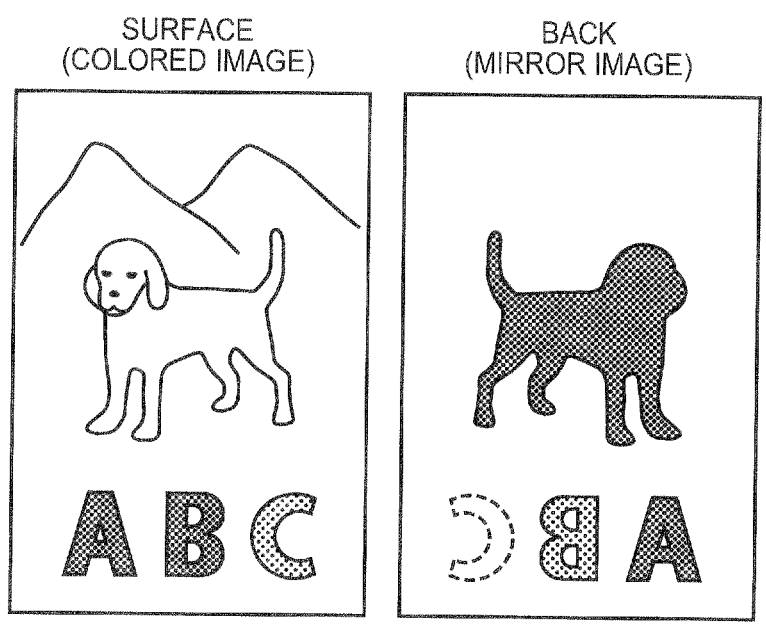
FIGS. 5A, 5B, and 5C are schematic plan views showing a specific example of the method of forming a three-dimensional image according to the embodiment of the invention.
Figure 5C:
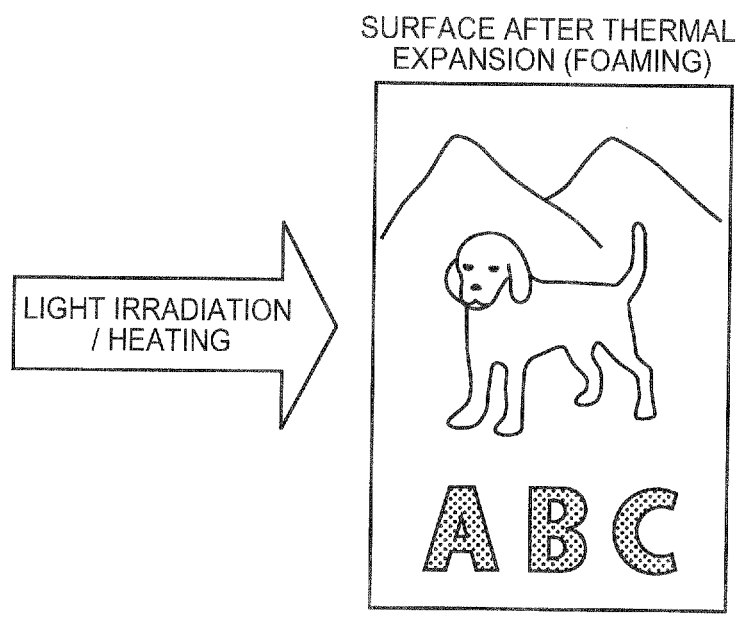
Figure 6A:
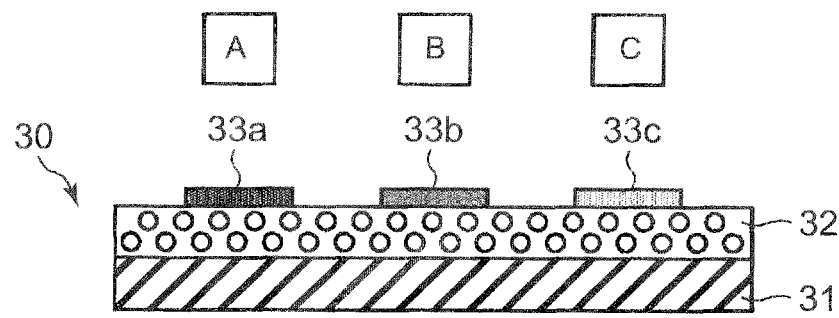
FIGS. 6A, 6B, 6C, and 6D are schematic cross-sectional views showing a specific example of the method of forming a three-dimensional image according to the embodiment of the invention.

FIGS. 5A, 5B, and 5C are schematic plan views showing a specific example of a method of forming a three-dimensional image according to this embodiment, and FIGS. 6A, 6B, 6C, and 6D are schematic cross-sectional views showing the specific example of the method of forming a three-dimensional image according to this embodiment. Here, the same elements as those of the above-mentioned comparative example (see FIGS. 2 and 3) are denoted by the same reference numerals when being described. FIGS. 7A and 7B are views showing the concept of the data processing method (density setting method) of the method of forming a three-dimensional image according to this embodiment.

In the method of forming a three-dimensional image according to the invention, a data processing method, which adjusts and sets the density of a display color of a colored image formed on the surface of a thermally expandable sheet, is performed on the basis of the above-mentioned content of verification. That is, when a three-dimensional image, where only letter portions among an image of the dog and the images of the letters of "A", "B", and "C" printed on the surface of a thermally expandable sheet are formed with display colors having uniform density and bulge to different arbitrary heights, is formed as in the above-mentioned comparative example, print images of the dog and the letters are formed (printed) first with predetermined display colors on the surface of the thermally expandable sheet on the basis of surface image data as shown in FIG. 5A. At this time, density data of the display colors, which is set in the print images of the dog and the letters, and bulge height (foam height) data of the thermally expandable layer, which is planned in the print images of the dog and the letters when a three-dimensional image is formed by heating the thermally expandable sheet, are extracted on the basis of the surface image data. Further, the densities of the display colors are adjusted in anticipation of (in consideration of) the change of the color development states or the densities of the display colors set in the print images of the dog and the letters when a three-dimensional image is formed by heating the thermally expandable sheet on the basis of the density data, the bulge height data, and the above-mentioned content of verification, so that the original densities of the display colors set in the print images of the dog and the letters are achieved in the surface image data.

That is, when the color development states or the densities of the display colors of the colored images are changed due to the expansion of the surface of the thermally expandable sheet, the amount of expansion or the expansion rates of the surface of the thermally expandable sheet, which are derived on the basis of the bulge heights or the like of the thermally expandable layer, are calculated and the densities of the display colors of the colored images are adjusted according to the amounts of expansion or the expansion rates. Specifically, as shown in FIG. 6A, when the letter portion 33a of "A" bulges to the highest level, and the letter portion 33b of "B" bulges to a relatively high level (an arbitrary height lower than the height of "A") among the images of the letters of "A", "B", and "C" shown in FIG. 5A due to, for example, the expansion of the surface of the thermally expandable sheet 30, so that the densities of the display colors of the letter portions 33a and 33b of "A" and "B" are reduced, the amount of expansion or the expansion rates of the surface of the thermally expandable sheet 30 are calculated on the basis of the bulge heights or the like of the thermally expandable layer 32 and the densities of the display colors are individually set to be high according to the amounts of expansion or the expansion rates in advance so that the reduction of the densities of the display colors of the letter portions 33a and 33b of "A" and "B" is substantially cancelled (offset). Here, since the color development state or the density of the display color of the letter portion 33c of "C", which does not bulge, is not changed, the density of the display color of the letter portion 33a of "A" is set to be higher than the density of the letter portion 33c and the density of the display color of the letter portion 33b of "B" is set to a relatively high level (the density lower than the density of "A"). The print images of the letters of which the densities are individually set in this way are formed (printed) on the surface of the thermally expandable sheet 30. Meanwhile, a colored portion is not formed on the surface of the thermally expandable sheet in order to make the print image of the dog bulge to an arbitrary height while the image of the dog is formed with the background color of the thermally expandable sheet 30 (for example, a substantially white color).

Figure 6B:
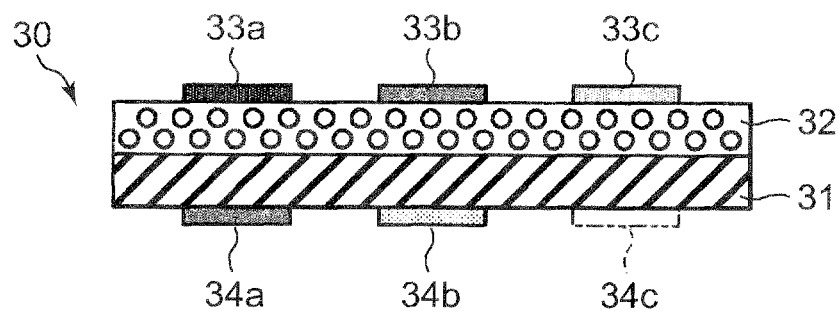
Figure 7A:
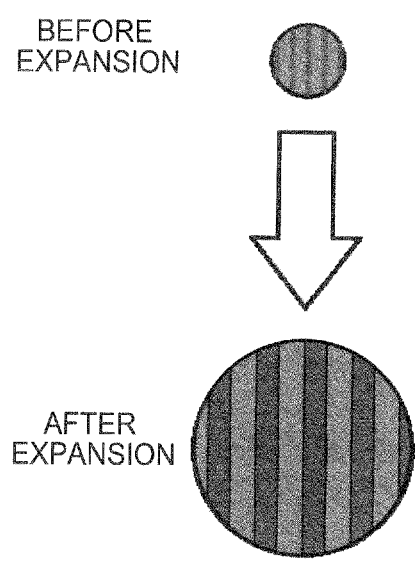
FIGS. 7A and 7B are views showing the concept of a data processing method (density setting method) of the method of forming a three-dimensional image according to the embodiment of the invention.
Figure 7B:
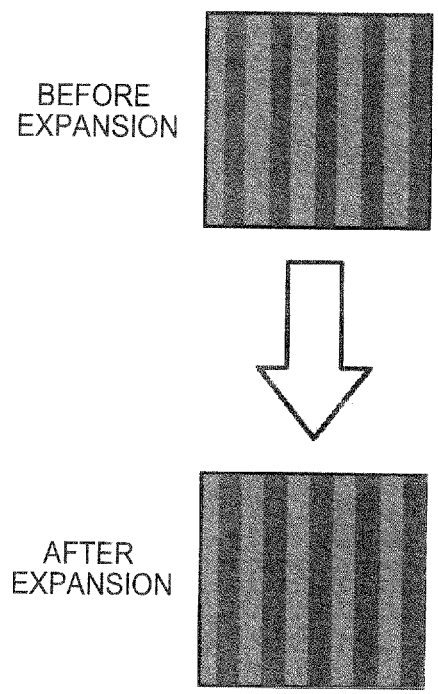

After that, mirror images, which are to be inverted print images of the print images of the dog and the letters formed on the surface of the thermally expandable sheet, are formed on the basis of the surface image data, and are formed (printed) on the back of the thermally expandable sheet 30 as shown in FIGS. 5B and 6B. Here, the densities of the black components of the mirror images corresponding to the print images of the dog and the letters are set on the basis of the bulge height data of the thermally expandable layer 32 that are planned in the print images of the dog and the letters and extracted from the surface image data.

That is, the density of the black component of the mirror image is set so that the print image of the dog has an arbitrary bulge height as shown in FIG. 5B, the density of the black component of a mirror image 34a is set to a high level so that the letter portion 33a of "A" bulges to the highest level as shown in FIG. 6B, and the density of the black component of a mirror image 34b is set to a relatively high level (a density lower than the density of "A") so that the letter portion 33b of "B" bulges to a relatively high level (an arbitrary height lower than the height of "A"). Meanwhile, a mirror image 34c of the letter portion 33c is not formed so that the letter portion 33c of "C" does not bulge (the mirror image 34c is shown in FIGS. 5B and 6B by a two-dot chain line for convenience).

Figure 6C:
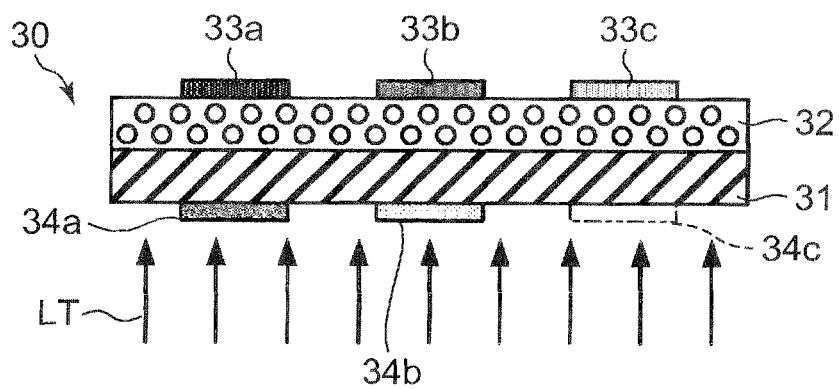
Figure 6D:
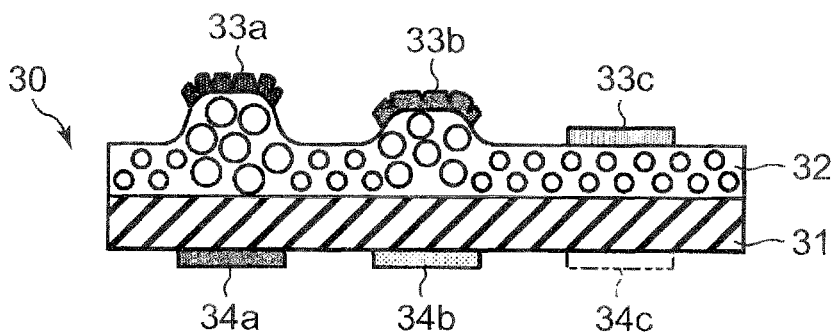

After that, the thermally expandable sheet is uniformly irradiated with light LT, which has a predetermined intensity, from the back of the thermally expandable sheet 30 as shown in FIG. 6C, so that thermal energy is generated according to the densities of the black components of the mirror images shown in FIG. 5B. As a result, the regions of the thermally expandable layer 32 corresponding to the mirror images are heated and expanded as shown in FIG. 6D. Here, the densities of the black components of the mirror images formed on the back of the thermally expandable sheet 30 are set according to bulge heights, which are planned in the colored images formed on the surface of the thermally expandable sheet 30, and the densities of the display colors of the colored images are set according to the amount of expansion or the expansion rates of the thermally expandable layer 32, which are derived on the basis of the bulge heights or the like, by the above-mentioned data processing method. Accordingly, even when the thermally expandable layer 32 is expanded to the bulge heights planned in the colored images so that the letter portions 33a and 33b of "A" and "B" are stretched together with the thermally expandable sheet 30 as shown in FIG. 6D, states where the densities of the letter portions 33a and 33b are reduced and the display colors become pale become substantially the same as the densities that are originally planned in the surface image data (in other words, the density of the letter portion 33c of "C" that does not bulge). This state is conceptually shown in FIGS. 7A and 7B. FIG. 7A is a conceptual diagram showing that the densities of the colored portions (that is, the above-mentioned letter portions 33a and 33b) of the colored images are changed (reduced) due to the expansion of the thermally expandable layer 32 caused by the light irradiation/heating processing and the densities of the display colors are changed (reduced), and the display colors of which the densities are reduced after expansion correspond to the display colors having the originally planned densities. Further, FIG. 7B is a conceptual diagram showing that non-uniformity is suppressed in the color development and the color development states of the colored portions (that is, the letter portions 33a and 33b) of the colored images are not changed even though the thermally expandable layer 32 is expanded by the light irradiation/heating processing.

Accordingly, it is possible to form a good three-dimensional image of which letter portions among the print images of the dog and the letters of "A", "B", and "C" are formed with display colors having uniform density or in good color development states and bulge to different arbitrary heights as shown in FIG. 5C. In other words, it is possible to form a good three-dimensional image where the patterns of any of the print images of the dog and the letters shown in FIG. 5C have display colors having the planned intended densities or good color development states and have intended bulge heights.

Furthermore, in the method of forming a three-dimensional image according to the invention, it is possible to form a three-dimensional image that has the display colors having intended densities or good color development states and has intended bulge heights not only in a case where the display colors of the colored images formed on the surface of the thermally expandable sheet are set to a single color for each of the print images of the dog and the letters but also in a case where regions having different arbitrary densities are set in one print image according to patterns or the like as shown in FIGS. 5 and 6.

<Apparatus for Forming Three-Dimensional Image>

Next, an apparatus for forming a three-dimensional image, which can realize the above-mentioned method of forming a three-dimensional image, will be described.

Figure 8A:
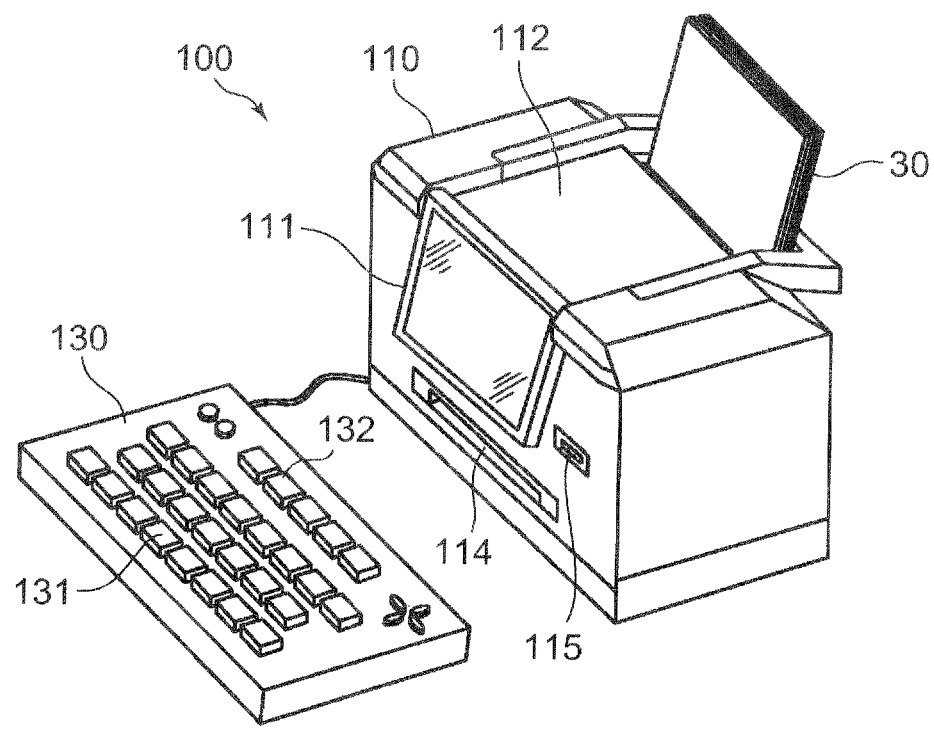
FIGS. 8A and 8B are schematic views showing an example of a printer that is applied to an apparatus for forming a three-dimensional image according to the invention.
Figure 8B:
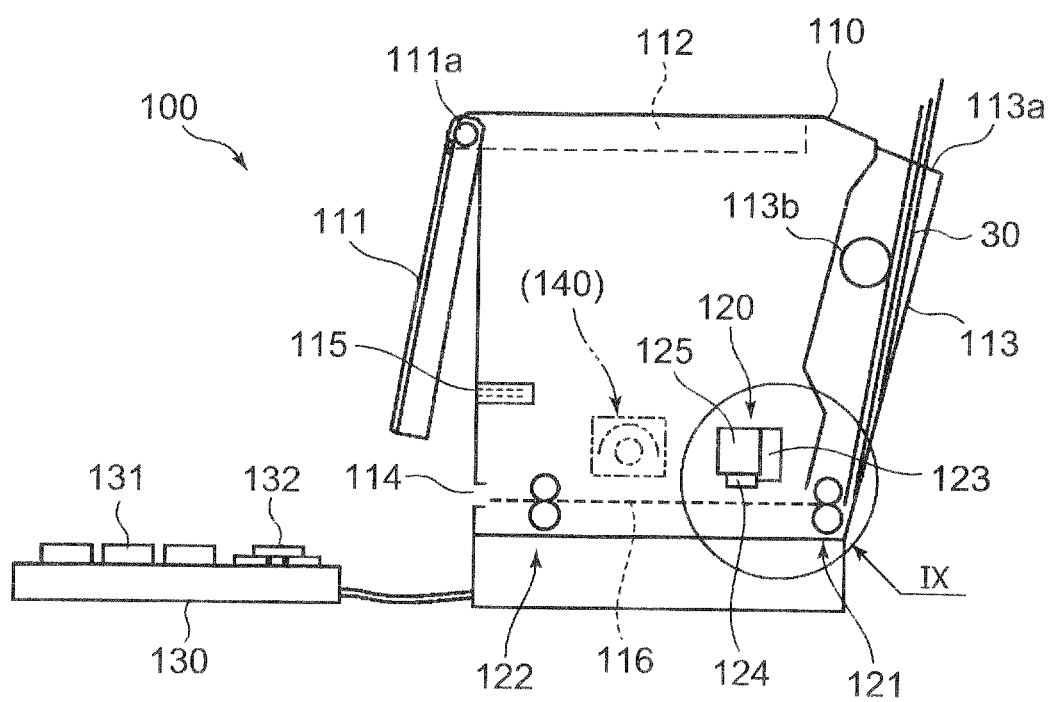
Figure 9:
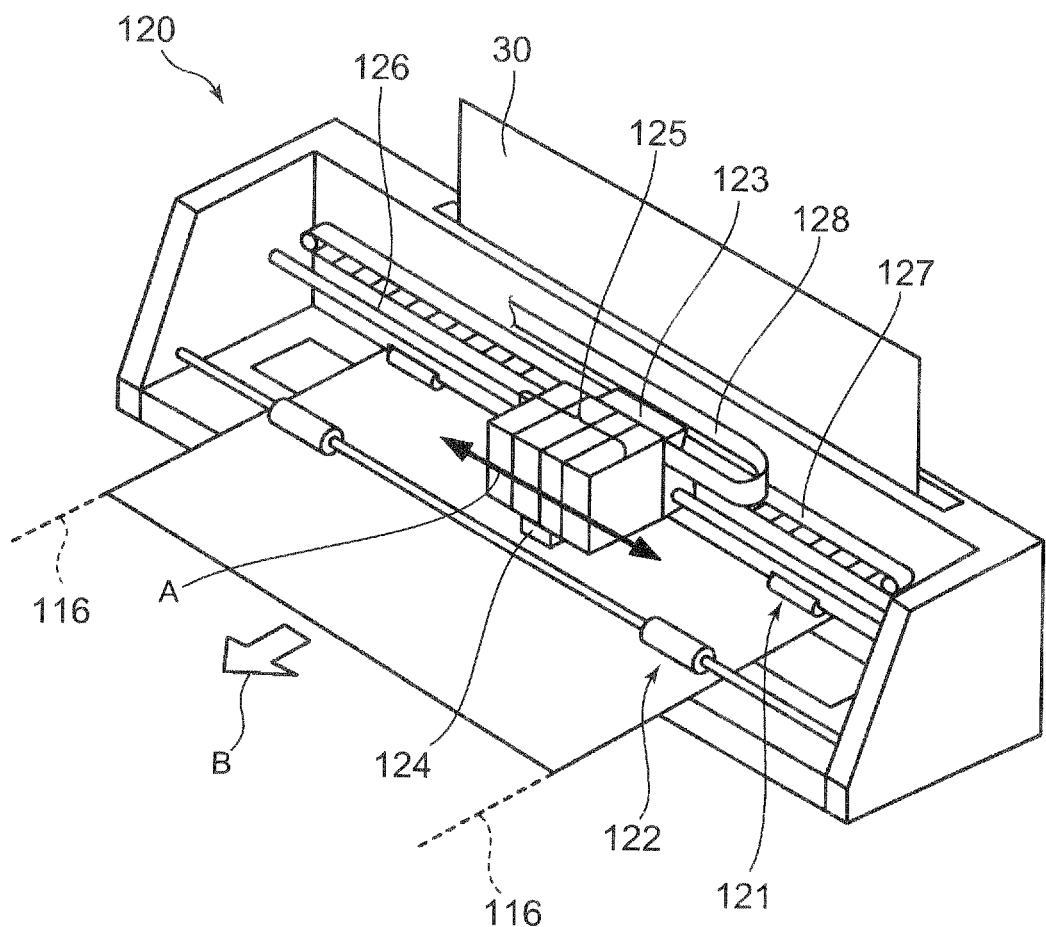
FIG. 9 is a schematic view showing an example of a printing mechanism of the printer applied to an embodiment of the invention.

FIGS. 8A and 8B are schematic views showing an example of a printer that is applied to an apparatus for forming a three-dimensional image according to the invention. FIG. 8A is a perspective view showing the schematic structure of the printer applied to this embodiment, and FIG. 8B is a cross-sectional view showing the schematic structure of the printer applied to this embodiment. FIG. 9 is a schematic view showing an example of a printing mechanism of the printer applied to this embodiment. Here, FIG. 9 is a detailed perspective view of a portion IX shown in FIG. 8B (in this specification, "IX" is used as a reference numeral corresponding to a roman numeral "9" shown in FIG. 8 for convenience).

At least the image data generation processing (S101), the surface image formation processing (S102), and the back image formation processing (S103) of the above-mentioned method of forming a three-dimensional image can be performed by a printer 100 shown in FIG. 8. The printer 100 applied to this embodiment is an inkjet printer having a function of, for example, a word processor. Specifically, the printer 100 includes a printer body 110 and a keyboard 130 as shown in FIGS. 8A and 8B.

As shown in, for example, FIGS. 8A and 8B, the printer body 110 mainly includes a box-shaped housing, a display panel 111, a display panel receiving portion 112, a sheet feed tray 113, a sheet discharge port 114, a card slot 115, a printing mechanism (see FIG. 9) 120, and a control section (not shown; see FIG. 10).

The display panel 111 is formed of, for example, a liquid crystal display panel, and is mounted so as to be rotated relative to the printer body 110 about a hinge portion 111a that is provided on one side. Data input from the keyboard 130, a menu screen required for various settings, various images such as photographic images provided through a memory card, and data required for the printer are displayed on the display panel 111. The display panel receiving portion 112 is provided at the upper surface portion (on the upper surface of FIG. 8B) of the printer body 110. When the printer 100 is not used, the display panel 111 is rotated and received in the display panel receiving portion 112.

The sheet feed tray 113 is provided on the rear portion (the right side in FIG. 8B) of the printer body 110. The thermally expandable sheets 30, which have been described in the above-mentioned embodiment, are received one by one in the sheet feed tray 113 from an opening portion 113a formed at the upper portion of the sheet feed tray 113, or received in the sheet feed tray 113 from an opening portion 113a while a plurality of thermally expandable sheets 30 overlap each other. A pick-up roller 113b is provided in the sheet feed tray 113. The pick-up roller 113b feeds the thermally expandable sheets 30, which are received in the sheet feed tray 113 while overlapping each other, to the printing mechanism 120, which is provided in the printer body 110, one by one.

The sheet discharge port 114 is formed at the lower portion of the front surface (the left side in FIG. 8B) of the printer body 110. The thermally expandable sheet 30, which is printed by the printing mechanism 120 provided in the printer body 110, is discharged to the outside through the sheet discharge port 114. The card slot 115 is formed at the front surface of the printer body 110. When a memory card (not shown) is inserted into the card slot 115, image data or the like are read or written.

Further, as shown in FIG. 8B, a sheet conveying path 116 along which the thermally expandable sheet 30 fed by the pick-up roller 113b provided in the sheet feed tray 113 is conveyed and guided is provided in the printer body 110. For example, an inkjet printing mechanism 120 is provided on the sheet conveying path 116. A pair of sheet feed rollers 121 and a pair of sheet discharge rollers 122, which convey the thermally expandable sheet 30, are disposed on the sheet feed side (the right side in FIG. 8B) and the sheet discharge side (the left side in FIG. 8B) of the printing mechanism 120, respectively.

As shown in FIG. 9, the printing mechanism 120 includes a carriage 123 that reciprocates in the direction of an arrow A orthogonal to the sheet conveying path 116. A printing head 124, which performs printing, and an ink cartridge 125 are mounted on the carriage 123. The ink cartridge 125 is formed of individual cartridges that store color inks, such as yellow, magenta, cyan, and black inks, or is formed of a single cartridge in which ink chambers for the respective colors are formed. The printing head 124, which includes nozzles for discharging the respective color inks, is connected to the respective cartridges or the respective ink chambers. Here, in this embodiment, a material having a high photothermal conversion property such as carbon black is applied as a black ink stored in the ink cartridge 125.

Further, the carriage 123 is supported by a guide rail 126 so as to reciprocate as described above. When a driving belt 127, which is provided parallel to the extending direction of the guide rail 126, is driven, the printing head 124 and the ink cartridge 125 mounted on the carriage 123 reciprocate in the same direction as the carriage 123, that is, in the direction of the arrow A orthogonal to the sheet conveying path 116.

Print data or a control signal is sent to the printing head 124 from the control section, which is provided in the printer body 110, through a flexible cable 128. Here, the thermally expandable sheet 30 is intermittently conveyed in the direction of an arrow B of FIG. 9 by the pair of sheet feed rollers 121 and the pair of sheet discharge rollers 122 as described above. Furthermore, during the stop of the intermittent conveyance of the thermally expandable sheet 30, the printing head 124 ejects ink droplets when being close to the thermally expandable sheet 30 while the printing head 124 reciprocates so as to correspond to the drive of the driving belt 127. In this way, the printing head 124 prints an image, which corresponds to the print data, on the surface or the back of the thermally expandable sheet 30. An intended image (a described colored image or a described mirror image) is formed (printed) on the entire surface of the thermally expandable sheet 30 by the repetition of the intermittent conveyance of the thermally expandable sheet 30 and the printing of the printing head 124 during the reciprocation of the printing head 124. The thermally expandable sheet 30 on which a predetermined image has been printed by the printing mechanism 120 is discharged to the outside of the printer body 110 from the sheet discharge port 114 that is positioned on the sheet discharge side of the sheet conveying path 116 as shown in FIGS. 8A and 8B.

Moreover, as shown in FIGS. 8A and 8B, the keyboard 130 is disposed on the near side in front of the printer body 110 (on the left side in FIGS. 8A and 8B). The keyboard 130 is provided with data input keys 131, function keys 132, and the like that are necessary to perform various functions, such as the input, the editing, the printing, or the like of document data when the printer body 110 is used as a word processor.

Next, the control section provided in the printer body 110 of the above-mentioned printer 100 will be described.

FIG. 10 is a functional block diagram of an example of the printer applied to this embodiment.

As shown in FIG. 10, the above-mentioned printer 100 mainly includes a central processing circuit (hereinafter, abbreviated to a "CPU") 101, a read-only memory (hereinafter, abbreviated to a "ROM") 102 that is connected to the CPU 101, a random access memory (hereinafter, abbreviated to a "RAM") 103, an image processing unit 104, a data input/output unit 105, a printer controller 106, a read controller 107, the above-mentioned display panel 111, and the above-mentioned keyboard 130. Here, the CPU 101, the ROM 102, the RAM 103, the image processing unit 104, the data input/output unit 105, the printer controller 106, and the read controller 107 correspond to the control section of the printer 100 applied to this embodiment.

The ROM 102 stores a system program related with the control of the operation of the printer 100. The CPU 101 controls the operation of each unit of the printer 100 by sending command signals to other functional blocks, which are connected to the CPU 101, according to this system program. Further, the RAM 103 temporarily stores various data, numerical values, and the like that are generated by the CPU 101 and the like during the control of the operation of the printer.

The image processing unit 104 performs the image data generation processing (S101) of the above-mentioned method of forming a three-dimensional image. That is, image data (back image data) of a mirror image that is to be an inverted image of a colored image are generated on the basis of the image data (surface image data) of a colored image that is to be a target of a three-dimensional image input from the outside of the printer body 110 through the card slot 115 and the like and displayed on the display panel 111 or stored in the RAM 103 and the like. At this time, on the basis of the density data of display colors that are set in specific regions or pixels such as patterns or the like of the colored images and bulge height (foam height) data that are planned in the specific regions or the like when a three-dimensional image is formed, the densities of the display colors set in the specific regions or the like are adjusted by the data processing method of the above-mentioned method of forming a three-dimensional image. Further, the densities of black components of the mirror images contained in the back image data are set on the basis of the bulge heights that are planned in the specific regions or the like of the colored images. In this way, the image processing unit 104 has a function of adjusting the densities of the colored images that are formed on a thermally expandable sheet or mirror images of the colored images.

The data input/output unit 105 inputs and outputs print commands, which are related with the image data, between the printer and an external communication device (not shown), such as a notebook personal computer or a desktop personal computer. The printer controller 106 is connected to the printing mechanism 120, and controls the discharge of the ink of the printing head 124 on the basis of the data of an image that is to be a target to be printed. Further, the printer controller 106 controls the conveyance of the thermally expandable sheet 30 to the sheet discharge side by controlling the reciprocation of the carriage 123 on which the printing head 124 is mounted and the drive of the pair of sheet feed rollers 121 and the pair of sheet discharge rollers 122. The read controller 107 is connected to the card slot 115, reads image data from a memory card (not shown) inserted into the card slot 115, and sends the image data to the CPU 101 or the image processing unit 104.

According to the printer 100 having the above-mentioned configuration, it is possible to form (print) an image (a colored image or a mirror image), which has a predetermined density corresponding to the image data, on the surface or the back of the thermally expandable sheet 30 that is fed from the sheet feed tray 113. Meanwhile, a case where the printer 100 has a function of printing an image only on one surface of a sheet has been described in this embodiment. That is, in the surface image formation processing (S102) of the above-mentioned method of forming a three-dimensional image, the thermally expandable sheet 30 is fed so that the surface of the thermally expandable sheet 30 faces the printing head 124. Accordingly, an intended colored image is printed on the surface of the thermally expandable sheet 30. Moreover, in the back image formation processing (S103), the thermally expandable sheet 30 is turned upside down and is fed so that the back of the thermally expandable sheet 30 faces the printing head 124. Accordingly, a mirror image corresponding to the colored image formed on the surface of the thermally expandable sheet 30 is printed on the back thereof.

The printer applied to the apparatus for forming a three-dimensional image according to the invention is not limited thereto, and may be provided with sheet reversing mechanisms for double-sided printing on the sheet feed side and the sheet discharge side of the printing mechanism 120 of the printer body 110 as shown in FIGS. 8B and 9. That is, in the printing mechanism 120, the thermally expandable sheet 30 on which printing has been completed on the surface (or the back) and which is conveyed to the sheet discharge side may be conveyed in the direction opposite to the arrow B and then return to the sheet feed side. The thermally expandable sheet 30 may be reversed and turned upside down on the sheet feed side, printing may be performed on the back (or the surface) of the thermally expandable sheet 30, and the thermally expandable sheet 30 may be discharged from the sheet discharge port 114. According to this, it is possible to omit a work for turning the thermally expandable sheet 30, which is discharged after being subjected to printing on one surface thereof, upside down and receiving the thermally expandable sheet 30 in the sheet feed tray 113 again.

Further, a case where the image data generation processing (S101) of the method of forming a three-dimensional image according to this embodiment is performed by the image processing unit 104 provided in the control section of the printer 100 has been described in the above-mentioned embodiment. However, the invention is not limited thereto. That is, the above-mentioned image data generation processing may be performed in an external communication device such as a personal computer connected to the printer 100 through the data input/output unit 105, the image data (surface image data and back image data) of the colored image of which the density of the display color is set and a mirror image thereof may be sent to the printer 100, and the colored image and the mirror image thereof may be formed (printed) on the thermally expandable sheet 30 so as to have a predetermined density.

Furthermore, a case where the image data generation processing (S101), the surface image formation processing (S102), and the back image formation processing (S103) of the method of forming a three-dimensional image according to this embodiment are performed by the printer 100 has been described in the above-mentioned embodiment. However, the invention is not limited thereto. That is, for example, as shown by a two-dot chain line in FIG. 8B, a light source unit 140 such as a halogen lamp may be disposed on the upper surface side or the lower surface side of the sheet conveying path 116 (or the thermally expandable sheet 30) on the sheet discharge side of the printing mechanism 120. Here, for example, as shown by a two-dot chain line in FIG. 10, the light source unit 140 emits light, which has a predetermined intensity, on the basis of a command from the CPU 101 according to the conveyance of the thermally expandable sheet 30.

In this configuration, the thermally expandable sheet 30 where a colored image and a mirror image have been formed on the surface and the back with a predetermined densities through the image data generation processing (S101), the surface image formation processing (S102), and the back image formation processing (S103) is irradiated with uniform light from the back thereof, thereby performing the light irradiation/heating processing (S104) for forming a three-dimensional image by expanding the thermally expandable layer 32 of the thermally expandable sheet 30 so that the thermally expandable layer 32 bulges to a predetermined bulge height. That is, in a single printer 100, it is possible to collectively perform all the processes of the above-mentioned method of forming a three-dimensional image.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

The invention claimed is:

1. A method of forming a three-dimensional image, the method comprising:

forming a colored image on one surface of a thermally expandable sheet where a thermally expandable layer is formed on a surface of a base sheet;

forming a second print image on a region of the other surface of the thermally expandable sheet with a photothermal conversion material, wherein the second print image is a mirror image of the colored image, and the region of the other surface corresponds to the colored image on the one surface; and forming a three-dimensional image of the colored image by selectively expanding the thermally expandable layer with thermal energy that is generated in the second print image by irradiating the thermally expandable sheet with light from the other surface of the thermally expandable sheet;

wherein, in the forming of the colored image on the one surface of the thermally expandable sheet, a density of a display color of a first part of the colored image is set as a first density and a density of a display color of a second part of the colored image is set as a second density which is higher than the first density according to a bulge height of the thermally expandable layer in consideration of a change of the density of the display color of the first and second parts of the colored image caused by the expansion of the thermally expandable layer, so that an originally planned density of the display colors set in the first part and the second part of the colored image is achieved even after the expansion of the thermally expandable layer when the colored image is formed, wherein the originally planned density of the display color of the first part of the colored image after the expansion is equal to the originally planned density of the display color of the second part of the colored image after the expansion, and wherein the bulge height of the thermally expandable layer in a region corresponding to the second part of the colored image after the expansion is to be higher than the bulge height of the thermally expandable layer in a region corresponding to the first part of the colored image after the expansion; and wherein, in the forming of the second print image on the other surface of the thermally expandable sheet, a density of the second print image containing the photothermal conversion material is set such that the bulge height of the thermally expandable layer becomes a planned arbitrary height after forming the three-dimensional image of the colored image.

2. The method according to claim 1, wherein, in the forming of the three-dimensional image of the colored image, the setting of the density of the display color of the first and second parts of the colored image is performed at a magnification proportional to an expansion rate that is derived based on the bulge height of the thermally expandable layer with respect to the originally planned density of the display colors after the expansion set in the first part and the second part of the colored image, and wherein the expansion rate is a ratio of an area of the colored image after the expansion with respect to an area of the colored image before the expansion.

3. The method according to claim 1, wherein the colored image includes colored portions that have different display color densities, and wherein the second print image includes specific portions where densities of the photothermal conversion material are set so as to correspond to the colored portions having the different densities of the colored image.

4. The method according to claim 3, wherein the light includes infrared wavelengths.

5. The method according to claim 1, wherein the forming of the colored image is performed based on received print image data and the originally planned density is a density based on density data that are set in the print image data in advance.

6. The method according to claim 1, wherein the light includes infrared wavelengths.

* * * * *